United States Patent [19]

Olschewski et al.

[11] Patent Number: 4,512,670
[45] Date of Patent: Apr. 23, 1985

[54] SEALED BEARING CUP FOR UNIVERSAL JOINT

[75] Inventors: Armin Olschewski; Gerhard Herrmann, both of Schweinfurt; Bernhard Bauer, Hassfurt, all of Fed. Rep. of Germany

[73] Assignee: SKF Kugellagerfabriken GmbH, Schweinfurt, Fed. Rep. of Germany

[21] Appl. No.: 494,436

[22] Filed: May 13, 1983

[30] Foreign Application Priority Data

May 15, 1982 [DE] Fed. Rep. of Germany ... 8214244[U]

[51] Int. Cl.³ .............................................. F16C 33/78
[52] U.S. Cl. .................................. 384/147; 384/485; 308/DIG. 4
[58] Field of Search ......... 384/147, 485, 484; 308/187.1, DIG. 4; 277/38, 207 R, 95, 40; 464/128

[56] References Cited

U.S. PATENT DOCUMENTS

| 3,235,276 | 2/1966 | Leonard | 277/207 R |
| 3,311,430 | 3/1967 | Christensen et al. | 277/95 |
| 3,511,513 | 5/1970 | Dahlheimer | 277/38 |
| 3,669,458 | 6/1972 | Witzenburg | 277/38 |
| 4,348,030 | 9/1982 | Johnston | 277/40 |
| 4,445,875 | 5/1984 | Kosuda et al. | 464/128 |

Primary Examiner—Lenard A. Footland
Attorney, Agent, or Firm—Eugene E. Renz, Jr.

[57] ABSTRACT

A sealed bearing cup, in particular, for universal joints which has a support body connected to the bearing cup and a seal ring fastened to this body having at least one axially elastically deformable sealing lip, characterized in that the support body (10) with the seal ring (13) is arranged axially slidable in the bore of the bearing cup (2) and is provided with a radially flange (17) which is located opposite the front face (16) of the bearing cup (2).

7 Claims, 2 Drawing Figures

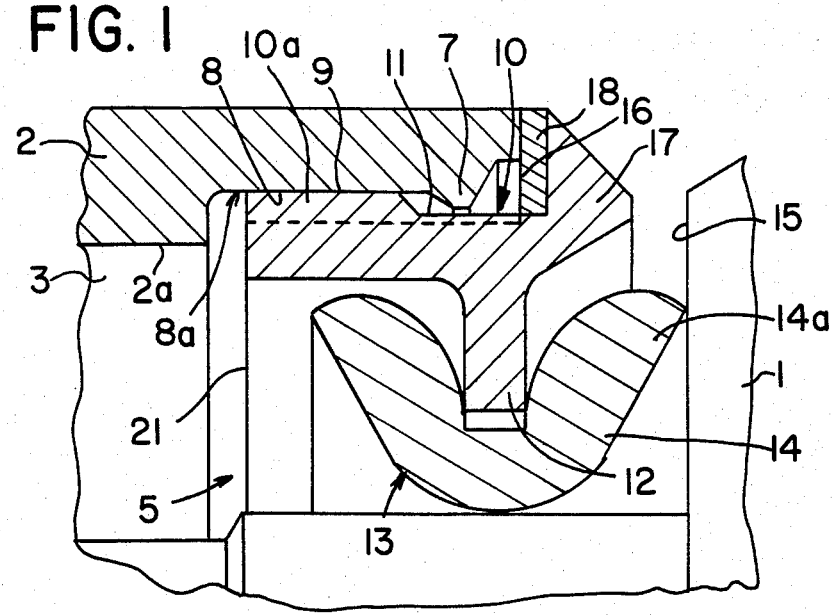
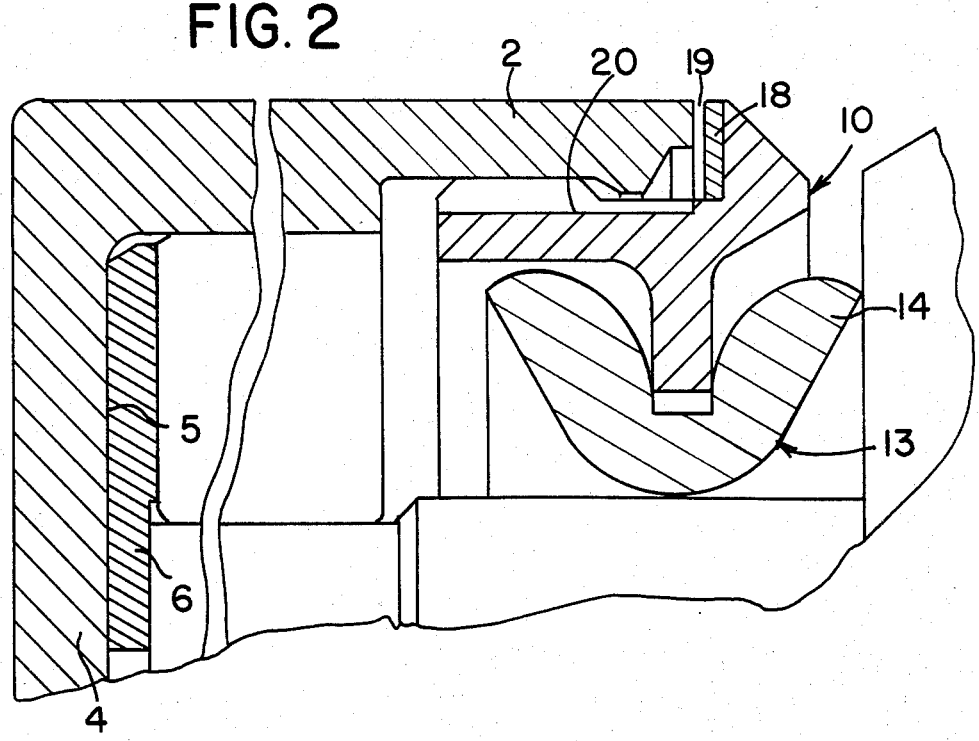

SEALED BEARING CUP FOR UNIVERSAL JOINT

BACKGROUND OF THE INVENTION

1. Field of the Invention

The present invention relates to sealed bearing cups, particularly for universal joints and comprising a support body connected to the bearing cup and a seal ring arranged on the support body with at least one axially projecting sealing lip.

2. Description of the Prior Art

A typical prior art seal for bearing cups of universal joints is shown in German Preliminary application No. 2,313,091. In the seal shown in this application, the support body is secured to the stepped end of the outer surface of the bearing cup and extends in an axial direction beyond the front face of the bearing cup. By reason of this construction, the cup and seal encompass a relatively large space in an axial direction. Furthermore, it has been found that in this bearing cup seal arrangement, the spent lubricant grease can be pressed with relative difficulty through the narrow gap between the seal ring and the journal of the universal joint.

SUMMARY OF THE INVENTION

With the foregoing in mind, it is an object of the present invention to provide an improved sealed bearing cup characterized by novel features of construction and arrangement which takes up comparatively little space in an axial direction and wherein post lubrication of the bearing is facilitated very easily without lifting the sealing from its sealing face. To this end, the seal for the bearing cup comprises a support body connected to the bearing cup and a seal ring having at least one axially extending elastically deformable sealing lip wherein the support body and seal ring are axially slideable in the bore of the bearing cup and including a radially outwardly directed flange disposed adjacent the front face of the bearing cup. By this arrangement, the bearing support with the seal ring is movable in an axial direction during injection of lubricant against the spring force of a sealing lip whereby an annular gap is formed from which the spent lubricant can escape.

In accordance with another feature of the present invention, an elastic sealing disc which is axially deformable is mounted between the bearing cup and the flange of the support body which after lubrication, abuts the front face of the bearing cup. This arrangement provides a tight seal after lubrication of the annular gap between the front face of the bearing cup and the flange of the support body.

In accordance with still another feature of the present invention, the support body has at least one axial groove and preferably a plurality of grooves formed in its peripheral surface which extend from the front face of the bearing cup to the radially outwardly directed flange of the support body. These grooves serve as venting means for the used lubricant, such as grease.

In accordance with still another feature and object of the present invention, the cup at its open end near the support body is provided with a peripheral radially inwardly directed projection which snaps into an annular recess in the outer peripheral surface of the support body whereby the components are held together as a unit even though in an unassembled state.

DESCRIPTION OF THE DRAWINGS

These and other objects of the present invention and the various features and details of the operation and construction thereof are hereinafter more fully set forth with reference to the accompanying drawing, wherein;

FIG. 1 is a fragmentary cross sectional view of a bearing cup for universal joints incorporating a seal assembly in accordance with the present invention; and FIG. 2 is a fragmentary cross sectional view similar to FIG. 1 showing the position of the seal during lubrication of the bearing.

DESCRIPTION OF THE PREFERRED EMBODIMENT

Referring now to the drawing, and particularly FIG. 1 thereof, there is illustrated a seal assembly constructed in accordance with the present invention for a universal joint assembly. The universal joint is of generally conventional construction and includes a journal 1 rotatably supported in a bearing cup 2 by bearing means, in the present instance, a plurality of cylindrical rollers 3, the bearing cup in turn being supported in an opening in the fork eye of the universal joint. A slip disc 6 made of a low friction material rests against the bottom wall 4 of the bearing cup to provide an axial support for the journal 1 of the universal joint. The bearing cup is provided with a circumferentially extending, radially inwardly directed projection or rib 7 adjacent its outer terminal open end and a recessed portion 8a offset relative to the bearing race 2a and having a bore of greater diameter than the race ring surface 2a. This offset recess 8a defines a pocket for a portion of the seal assembly generally designated by the numeral 10a having a friction surface 9 and affording limited axial movement of the seal assembly relative to the bearing cup 2 in a manner described in more detail below. The seal assembly as illustrated comprises a generally cylindrical body portion 10, a radially outwardly directed circumferentially extending lip or sealing flange 17 at one axial end of the body portion 10, and a radially inwardly directed flange 12. As illustrated, the body portion 10 has an annular recess 11 in its outer periphery between the sealing flange 17 and the enlarged inner end at the body portion 10a which is of a diameter closely conforming to the diameter of the bore 8 and defining a friction surface 9 of the support body 10 which is engageable with the bore or pocket 8 and is axially slideable relative thereto. During assembly of the seal, the flexibility permits insertion of the seal from the open inner end of the bearing cup 2 to a position where the projection or rib 7 snaps into the annular recess 11 of the support body 10. Note that the recess 11 is of a greater axial dimension than the width of the projection 7 to allow a limited axial movement of the seal when it is in the assembled relation as shown in FIG. 1.

The seal assembly further includes a seal ring 13 circumscribing a stepped portion of the journal 1 which seal ring 13 is of V-shaped cross section defining a pair of angularly disposed sealing lips 14, 14a the outer sealing lip 14a engaging in positive contact a shoulder 15 of the universal joint 1. The radially inwardly directed flange 12 of the body portion 10 engages in the V-shaped pocket 14b formed by the sealing lips 14 in a manner to allow radial sliding movement of the seal ring 13 to maintain a good seal even over a relatively wide range of tolerances of the universal joint components. The support body 10 and seal ring 13 are preferably made of a flexible, resilient material such as plastic.

The seal assembly includes a sealing disc 18 disposed between the flange 17 and the axial end face of the bearing cup. The sealing disc 18 is elastic in a axial direction and serves to cooperate or function with the seal ring 13 to prevent leakage of lubricant and penetration of foreign matter into the bearing space S during operation of the universal joint assembly. Lubricant may be injected into the bearing space S through a conventional bore or port arrangement in the trunnion of the universal joint or a bore in the bottom of the bearing cup. When it is desired to lubricate the bearing and with particular reference to FIG. 2, the support body 10 is moved axially outwardly by the lubricant pressure elastically deforming the sealing lip 14 until a gap 19 is produced between the sealing disc 18 and the front face of the bearing cup defining with several axially running grooves 20 in the outer periphery of the body portion 10, a flow path through which spent lubricant grease is pressed out or purged. After lubrication, the support body 10 slides back into the bearing cup as a result of the spring force of the sealing lip 14 until the sealing disc 18 abuts the front face 16 to again seal the bearing space.

Even though a particular embodiment of the invention has been illustrated and described herein, it is not intended to limit the invention and changes and modifications may be made therein within the scope of the following claims. For example, the sealing disc 18 may be omitted and a sealing lip formed integrally with the flange 17 engaged the axial end face of the bearing cup directly.

We claim:

1. Sealed bearing cup, in particular, for universal joints which has a support body connected to the bearing cup and a seal ring fastened to this body having at least one axially elastically deformable sealing lip, characterized in the the support body (10) with the seal ring (13) is arranged axially slidable in the bore of the bearing cup (2) and is provided with a radially outward flange (17) which is located opposite the front face (16) of the bearing cup (2), said support body (10) at its outside surface having several axially directed grooves (20) distributed over the periphery and running from the front face (21) to the radial flange (17) of the support body (10).

2. A seal as claimed in claim 1, characterized in that the bearing cup (2) at the open end near the support body (10) has a peripheral radially inward directed projection (7) which is arranged in an annular recess (11) at the outside surface of the support body (10).

3. A seal for universal joints including an open-ended bearing cup (2) and a journal (1) rotatably supported in the bearing cup comprising a support body (10) mounted in the bearing cup for axial sliding movement therein, a sealing lip (17) at one axial end of said support body (10) and means (13) normally biasing said sealing lip (17) in contact with the open end of the bearing cup to provide a seal therewith, said means permitting axial displacement of said seal to move said sealing lip out of engagement with the bearing cup when the internal lubricant pressure exceeds a predetermined value thereby permitting purging of spent lubricant from the interior of the bearing cup.

4. A seal as claimed in claim 3, wherein said means comprises a seal ring (13) cooperatively associated with the support body (10) and said journal (1).

5. A seal as claimed in claim 3, wherein said seal ring (13) is of V-shaped cross section having at least one wing flexibly engaging the journal (1) and wherein said support body (10) includes a depending radially inwardly directed flange engaging in the pocket formed by the wings (14) of the seal ring (13).

6. A seal as claimed in claim 3, wherein said support body (10) is provided with a series of circumferentially spaced grooves in the outer periphery confronting the inner bore of the bearing cup and defining channels for flow of lubricant from internally of the bearing cup to said sealing lip (17).

7. A seal as claimed in claim 3, wherein the bearing cup (2) at the open end near the support body (10) has a peripheral radially inward directed projection (7) which is arranged in an annular recess (11) at the outside surface of the support body (10).

* * * * *